United States Patent [19]

Moen

[11] Patent Number: 4,782,853
[45] Date of Patent: Nov. 8, 1988

[54] HOT AND COLD WATER MIXING VALVE WITH CONSTANT FRICTIONAL RESISTANCE

[75] Inventor: Alfred M. Moen, Destin, Fla.

[73] Assignee: Stanadyne, Inc., Windsor, Conn.

[21] Appl. No.: 109,999

[22] Filed: Oct. 19, 1987

Related U.S. Application Data

[63] Continuation-in-part of Ser. No. 944,202, Dec. 22, 1986, abandoned.

[51] Int. Cl.⁴ .................................... F16K 11/078
[52] U.S. Cl. ............................ 137/454.6; 137/625.17; 137/625.4; 251/64
[58] Field of Search ............ 137/454.2, 454.6, 625.17, 137/625.4, 636.4; 251/64

[56] References Cited

U.S. PATENT DOCUMENTS

| | | | |
|---|---|---|---|
| 2,556,780 | 6/1951 | Shryock | 137/625.17 |
| 3,285,278 | 11/1966 | Corlett | 137/625.17 X |
| 3,287,985 | 11/1966 | Moen | 137/625.17 X |
| 3,373,770 | 3/1968 | Ward | 137/615 |
| 3,378,034 | 4/1968 | Andrews | 137/625.4 |
| 3,415,280 | 12/1968 | Bucknell et al. | 137/625.17 |
| 3,428,088 | 2/1969 | Bell | 137/625.17 |
| 3,456,677 | 7/1969 | Mongerson | 137/625.17 X |
| 3,726,317 | 4/1973 | Moen | 137/625.17 |
| 3,730,222 | 5/1973 | Moen | 137/625.17 |
| 3,736,959 | 6/1973 | Parkison | 137/625.17 |
| 3,788,356 | 1/1974 | Moen | 137/625.17 |
| 3,943,961 | 3/1976 | Knapp | 137/625.17 X |
| 4,033,373 | 7/1977 | Manoogian et al. | 137/454.6 |
| 4,050,475 | 9/1977 | Watts | 137/625.17 |
| 4,183,376 | 1/1980 | Moen | 137/625.17 |
| 4,314,673 | 2/1982 | Rudelick | 137/625.17 X |
| 4,330,011 | 5/1982 | Moen | 137/625.17 |

*Primary Examiner*—John Rivell
*Attorney, Agent, or Firm*—Kinzer, Plyer, Dorn, McEachran & Jambor

[57] ABSTRACT

A hot and cold water mixing valve has a sleeve formed and adapted to fit within a valve fixture such as a kitchen faucet, lavatory faucet or shower/tub control. There is a stem which is positioned within the sleeve and rotatable and reciprocal relative thereto to control discharge through the mixing valve. The sleeve has hot and cold water inlet ports and an outlet. The stem includes a piston directing flow from the sleeve inlets to the sleeve outlet. The stem also includes a stem driver formed and adapted to have an operating handle mounted thereon with the stem driver being connected to the piston by a thin rod whose diameter is substantially less than the piston outer diameter. The stem is pressure unbalanced, with the amount of unbalance being determined by the cross sectional area of the thin rod. A non-movable seal member is positioned within the sleeve with the thin rod passing through the seal member. The stem driver is attached to the thin rod on one side of the seal member, with the piston being attached to the thin rod on the other side of the seal member. Friction means is effective to provide resistance to relative movement between the stem and sleeve. There are sleeve seal members attached to the exterior of the sleeve to provide a valve closing seal when the piston is in a closed position.

24 Claims, 4 Drawing Sheets

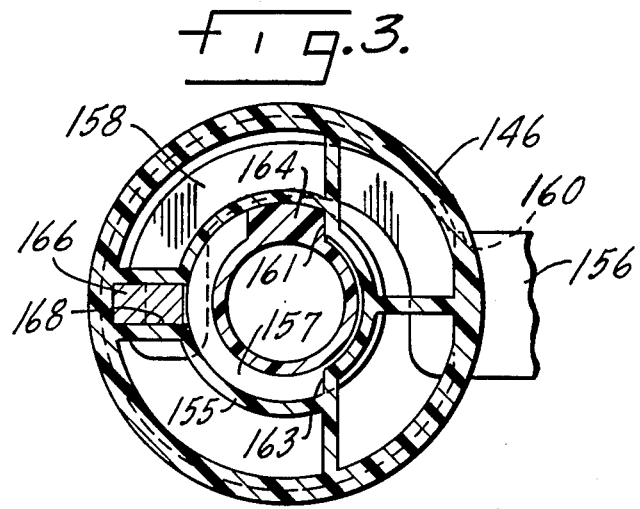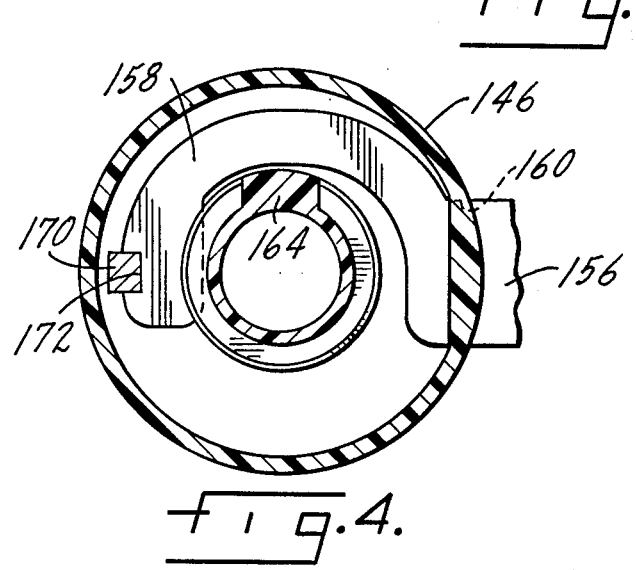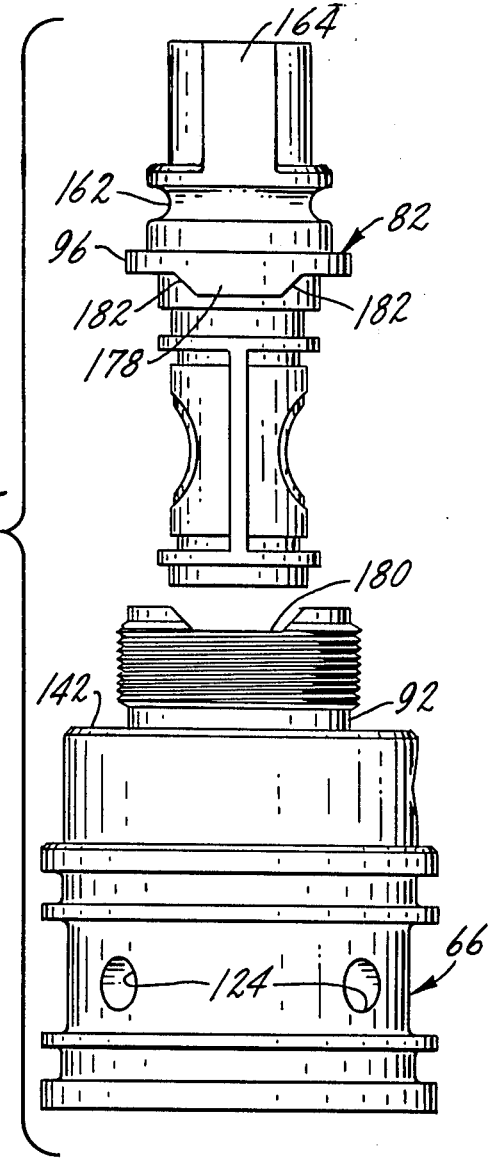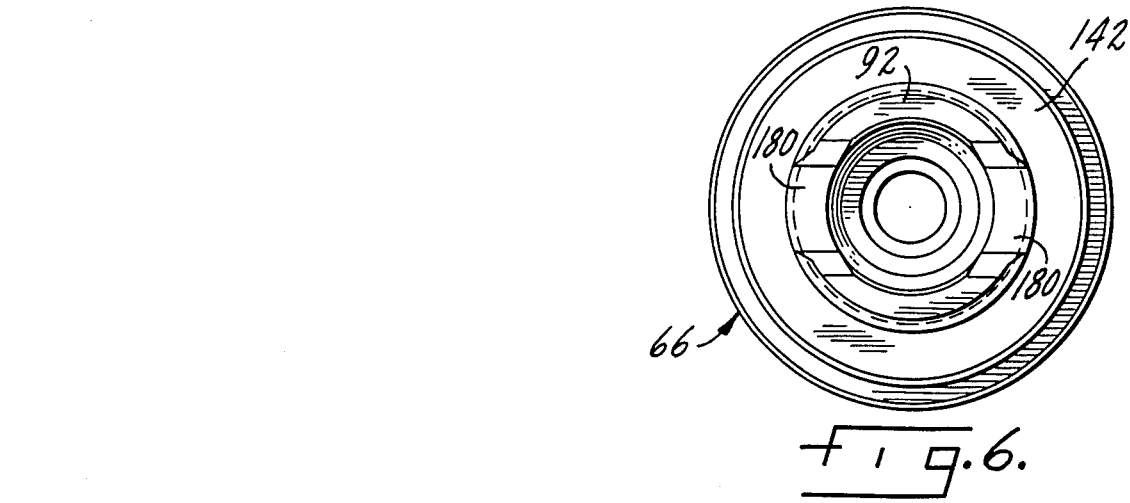

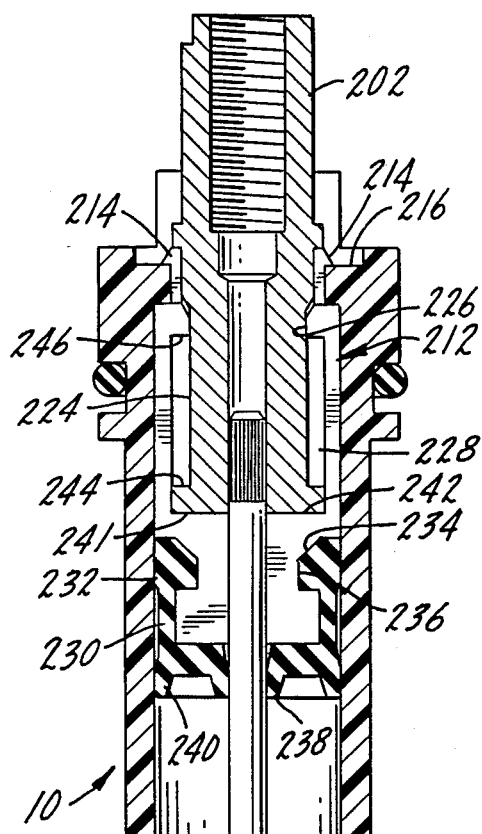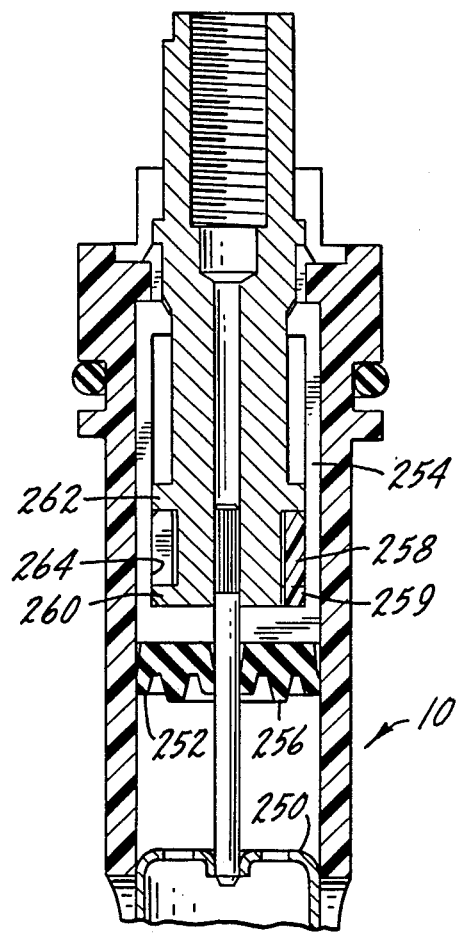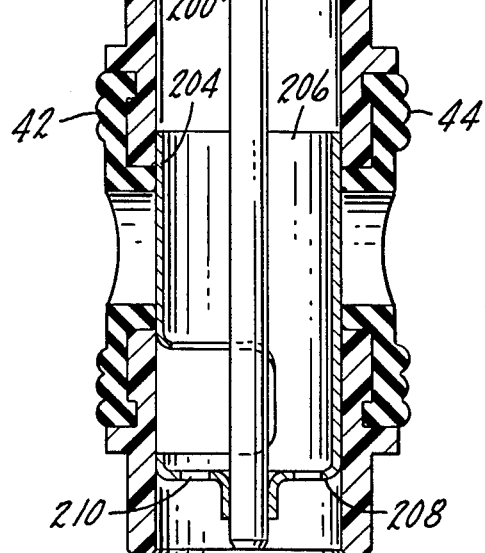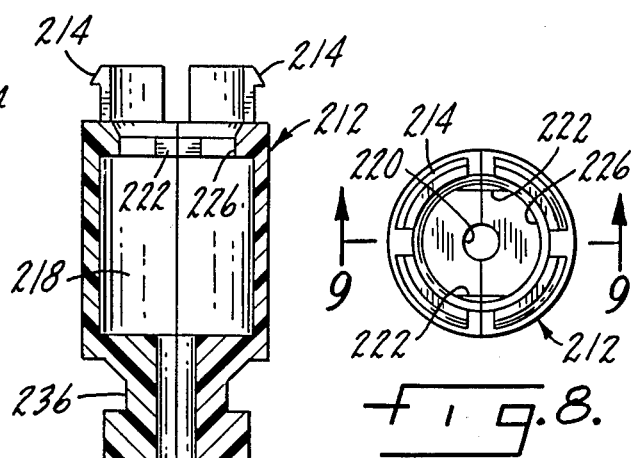

HOT AND COLD WATER MIXING VALVE WITH CONSTANT FRICTIONAL RESISTANCE

SUMMARY OF THE INVENTION

This application is a continuation-in-part of application Ser. No. 944,202, filed Dec. 22, 1986 now abandoned.

The present invention relates to hot and cold water mixing valves and in particular to an improved mixing valve having substantially constant friction resisting rotational and axial movement of the valve operating member over valve life.

Another purpose is a single lever mixing valve, in the form of a unitary cartridge, which has such reduced friction to rotational and axial valve operating movement that the valve remains functional even without lubrication.

Another purpose is a mixing valve of the type described which includes a brake to resist self-closing valve movement due to the weight of the valve parts.

Another purpose is a mixing valve cartridge of the type described which includes means for reducing the operating stress applied on the movable valve stem.

Another purpose is a mixing valve cartridge including all of the operating parts of the valve, insertable as a unit into a valve fixture, which includes locating means positioned on the exterior of the cartridge sleeve, which locating means also assists in removal of the cartridge for repair and replacement.

Another purpose is a mixing valve as described including rotational stops integral with the mixing valve cartridge.

Another purpose is a mixing valve construction including an auxiliary discharge which utilizes a venturi to increase the force of water from the auxiliary discharge.

Other purposes will appear in the ensuing specification, drawings and claims.

BRIEF DESCRIPTION OF THE DRAWINGS

The invention is illustrated in the following drawings wherein:

FIG. 3 is a section along plane 3—3 of FIG. 2, FIG. 4 is a section along plane 4—4 of FIG. 2, FIG. 5 is an exploded view of the cartridge and housing of FIG. 2, FIG. 6 is a top view of the housing of FIG. 5, FIG. 7 is an axial section through a further embodiment of mixing valve, as disclosed herein, FIG. 8 is an end view of stem control cage used in the embodiment of FIG. 7, FIG. 9 is a section along plane 9—9 of FIG. 8, and FIG. 10 is a partial axial section through yet a further embodiment of mixing valve as disclosed herein.

DESCRIPTION OF THE PREFERRED EMBODIMENT

The present invention is concerned with single lever mixing valves of the type wherein a rotatable and reciprocal stem controls both volume and temperature of the water discharge. Valves of the type described which are manufactured by the Moen Group of Stanadyne, Inc. have all of the operating parts of the valve within a unitary cartridge which is inserted in a valve fixture such as a kitchen faucet, lavatory faucet or shower/tub control. Such a valve cartridge may be replaced at periodic intervals, which has the effect of providing an essentially new faucet. The Moen Group of Stanadyne currently manufactures two types of valve cartridge. One such cartridge being illustrated in U.S. Pat. No. Re. 25,920 and the other type of cartridge being illustrated in U.S. Pat. Nos. 3,276,317, 3,730,222, 3,840,048 and 3,916,950, among others. Valve cartridges of the type shown and described in the latter group of patents have less frictional resistance to valve stem movement than valves of the type shown in the reissue patent, although the valves of the type shown in the reissue patent continue to be in substantial demand. Valves of the type shown in the latter group of patents are known commercially as the MOEN 1225 and valves of the type shown in the reissue patent are known commercially as the MOEN 1200. Such cartridges are lubricated at the factory before sale, with the amount of lubricant normally being sufficient to maintain the cartridge in excellent operating condition through its normal useful life. However, in the event of a loss of lubrication, normal movement of the cartridge operating stem can become difficult.

The present invention provides a mixing valve which is interchangeable with those described in the above patents and which will fit the kitchen faucet, lavatory faucet and shower/tub control valves of the Moen Group of Stanadyne, Inc. The present cartridge has substantially reduced and generally constant friction resisting rotational and axial movement of the valve stem over the life of the valve. The friction is reduced to such an extent that the cartridge is completelly functional without lubrication, eliminating the problem from potential loss of lubrication. Because there is such reduced friction to movement of the stem a brake has been added to control operation of the cartridge.

Figure 1:
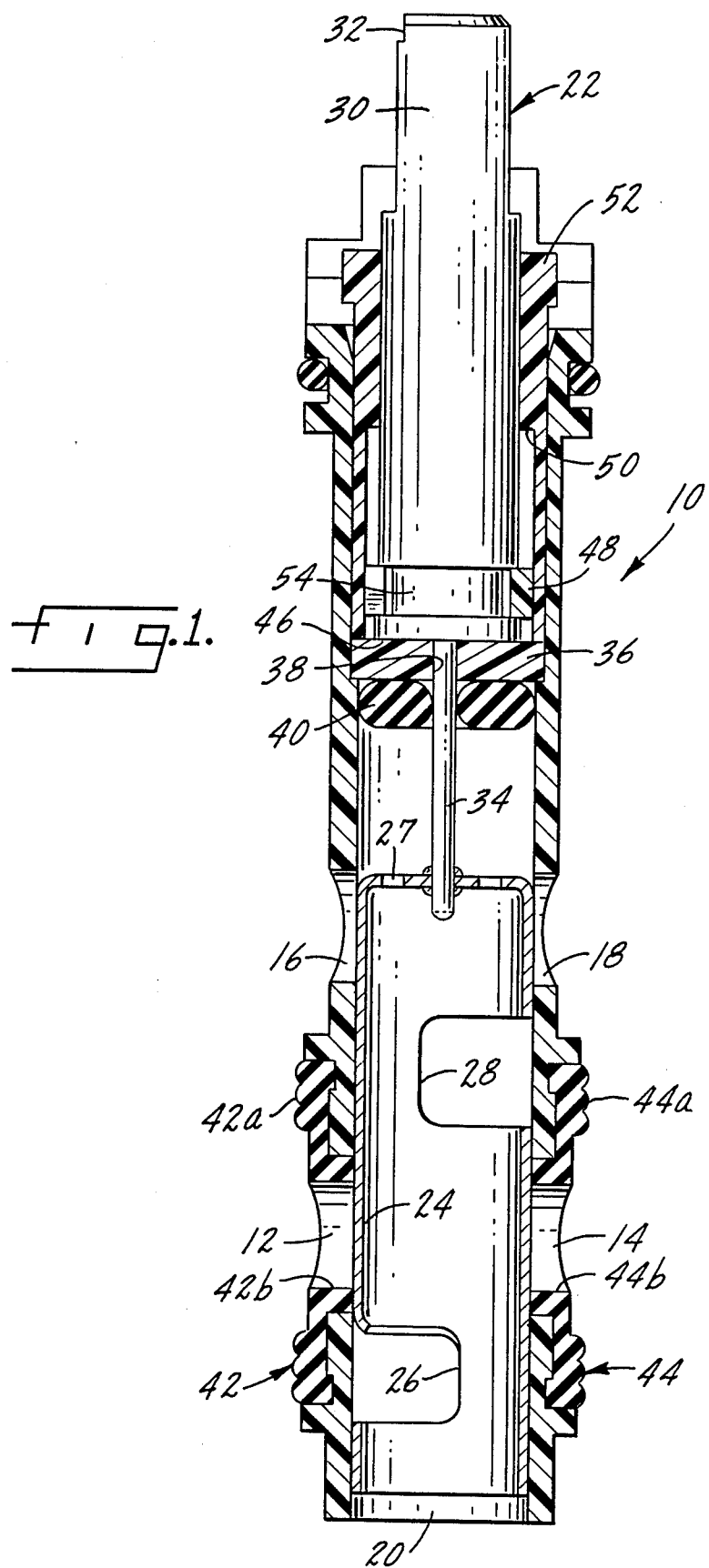
FIG. 1 is an axial section through one form of mixing valve, as disclosed herein.
Figure 2:
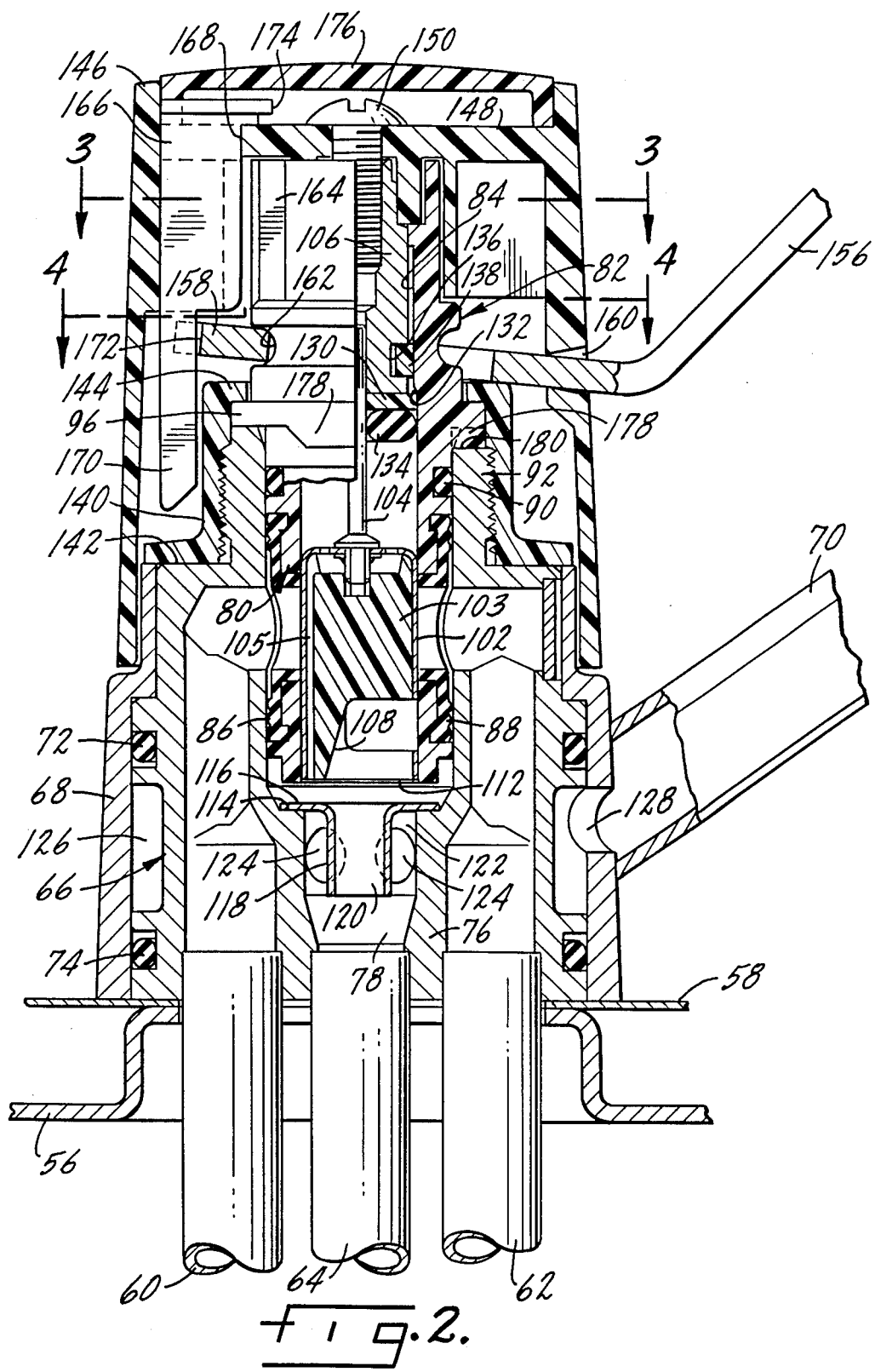
FIG. 2 is an axial section through a second embodiment of mixing valve, as disclosed herein.

In FIG. 1, the sleeve of the valve cartridge is indicated at 10 and has hot and cold water inlet ports 12 and 14, respectively, and radially extending outlet ports 16 and 18. Sleeve 10 has an open bottom 20 which, in some applications, may also function as an alternate discharge opening.

Positioned within sleeve 10 is a valve stem indicated generally at 22 which includes a thin shell hollow piston 24 having an inlet opening 26 movable into register with sleeve inlet ports 12 and 14 and an outlet opening 28 movable into register with sleeve outlet ports 16 and 18. Movement of the valve stem so that there is registration between piston inlet 26 and the sleeve inlet ports 12 and 14 will place piston outlet 28 in register with sleeve outlet ports 16 and 18. Piston 24 may have openings 27 in the upper end thereof so that water in the space above the piston will not impede valve movement.

Stem 22 further includes a stem driver 30 which has an end 32 formed and adapted to receive an operating handle or lever. Stem driver 30 is connected by a thin rod 34 to piston 24 with the combination of the stem driver, piston and thin rod together comprising stem 22.

As is customary in valves of this type, axial movement of the stem controls volume and rotary movement of the stem controls the temperature or the mixture of hot and cold water which will reach the chamber inside of hollow piston 24.

Positioned within sleeve 10 is a washer 36 having an opening 38 through which passes thin rod 34. On one side of washer 36 there is a seal in the form of an O-ring 40 whose outer periphery is in sealing contact with the interior of sleeve 10 and whose central opening is in sealing contact with the periphery of rod 34.

The valve closing seals are indicated at 42 and 44 and are specifically described in the above-mentioned patents. Such seals have outwardly-extending beads 42a and 44a, respectively, which are in contact with the interior of the housing or the valve fixture whether it be a kitchen faucet, lavatory faucet or shower/tub control. Each of the seals has port seal portions 42b and 44b, respectively, which are biased both by the inherent resiliency of the seal and by water pressure into sealing contact with piston 24. Thus, seals 42 and 44 form the valve closure when the valve is in the closed position indicated in the drawing.

The water pressure forces acting on stem 22 are in slight imbalance as contrasted to valves of the type described above currently made by the Moen Group of Stanadyne which are pressure balanced. The imbalance is slight in that the difference between water pressure forces tending to open the stem and those tending to close the stem relate to the cross section of rod 34. The diameter of the rod, as indicated, will be small, for example 1/16 in. or slightly larger. The size will depend to some degree on the material and a stainless steel rod may in fact have a size approximately 1/16 in. in diameter.

Since rod 34 has a small cross sectional area, it is necessary to avoid axial and compressive stresses which might be applied to the rod when the valve is moved to a full open or full closed position. This requires stops limiting movement of stem 22. The stop preventing inward movement of the stem to a point where the piston would contact a portion of the valve fixture is formed by contact between lower surface 46 of stem driver 30 and washer 36 supported by sleeve 10. The stem driver will contact the washer prior to the time that piston 24 would bottom on the valve fixture. The out stop is provided by contact between a friction brake 48 and a shoulder 50 formed on an internal cylinder 52 positioned within the sleeve. There will be contact between brake 48 and shoulder 50 prior to the time that the top surface of piston 24 would contact seal 40 which would otherwise limit the outward movement of stem 22.

Brake 48 is positioned within a groove 54 formed in the exterior of stem driver 30. In some applications, the brake may be integfral with the stem driver. The brake adds frictional resistance to axial and rotational movement of the stem relative to the sleeve. Without the brake it would be possible for the weight of the valve handle and/or lever to cause the stem to self-close, rather than being maintained in an open position even though the imbalance of water pressure forces on the stem urge it toward an open position. The normal frictional resistance to movement of the stem is that created between rod 34 and the interior passage of seal 40. This frictional resistance is quite small in contrast to the frictional resistance to movement in prior valves such as illustrated in the above-described patents. Because of this low frictional resistance, the weight of the elements of the stem and those attached to the stem may be sufficient to cause the valve to automatically close, thus requiring the brake to insure that the valve remains in an open position.

The principal resistance to frictional movement of the stem is that between rod 34 and seal 40. There may, in addition, be some frictional resistance from seals 42 and 44. Valves of this type are lubricated at the factory and normally that lubricant is sufficient to last for the useful life of the valve. In the present instance, because the frictional resistance to movement is so low, even without lubrication the valve is totally operable and the forces required to open it will remain constant and completely within the limits of the applicable plumbing standards for the life of the valve.

The valve cartridge of FIG. 1 may provide either a side discharge or a bottom discharge. In the embodiment disclosed in FIGS. 2-6, specifically a kitchen faucet, the valve cartridge is in concept the same as in FIG. 1, but is limited to a bottom discharge. A sink top support is indicated at 56 and the conventional escutcheon positioned thereon is indicated at 58. A hot water pipe is indicated at 60 and a cold water pipe is indicated at 62 and a hose spray pipe 64 is positioned between the inlet pipes. All three pipes extend through the escutcheon and into a valve housing indicated generally at 66. Housing 66 supports a decorative outer shell 68 which may be integral with a conventional spout 70. Shell 68 is sealed to the exterior of housing 66 by seal rings 72 and 74.

Housing 66 has an interior portion 76 which defines an outlet 78 in communication with hose spray pipe 64 and which supports the valve cartridge indicated generally at 80. Cartridge 80 includes a sleeve 82 mounting seal members 86 and 88 which are the same in construction as seals 42 and 44 of the FIG. 1 embodiment. In addition, there is a seal 90 which is mounted in an exterior groove and which is in sealing engagement with a cylindrical portion 92 of housing 66. Sleeve 82 has an outwardly-extending flange 96 which rests on the top surface of cylindrical portion 92 of housing 66. Although sleeve 82 is shown as a unitary structure, it may be constructed in two parts.

Within sleeve 82 is a stem including a piston 102, a thin rod 104 and a stem driver 106. These three elements are connected together and only piston 102 differs from the FIG. 1 embodiment. Piston 102 includes a water former 103, a solid element having a water directing surface 108 which, when the valve is open, will direct flow from the sleeve inlets to sleeve open bottom 112. A bypass passage is indicated at 105. Surface 108 provides for a smooth, non-turbulent change in water direction, maintaining water noise at a minimum.

Valve cartridge 80 includes a washer 130 which seats upon a shoulder 132 adjacent the upper end of sleeve 82. Seal ring 134 functioning the same as seal ring 40 in the FIG. 1 embodiment rests on the underside of washer 130. Stem driver 106 is positioned on the opposite side of washer 130 and the stem driver has a groove 136 which mounts a brake 138 which moves against the interior surface 84 of sleeve 82, again as in the FIG. 1 embodiment.

Housing portion 76 has a shoulder 114 which supports an outwardly extending flange 116 of a cup-shaped venturi member 118. The venturi member has an interior passage 120 which is in alignment with the discharge opening 112 of the sleeve and hose spray pipe 64. The cross sectional area of passage 120 is less than the cross sectional area of hose spray pipe 64. Within housing portion 76 is a chamber 122 which surrounds the venturi member and into which a plurality of housing discharge passages 124 open. The discharge passages are connected with a circumferential chamber 126 which surrounds housing 66 intermediate O-rings 72 and 74 and is in communication with spout 70 through a housing port 128. Water flowing out of the valve cartridge discharge may go either to hose spray pipe 64 or through passages 124 to space 126 and then through port 128 to spout 70. The direction the water takes at its discharge is determined by the operation of the hose spray or any other auxiliary device to which pipe 64 may be connected.

Venturi member 118 masks the housing discharge passages 124 and is spaced therefrom. Thus, when the auxiliary device is operated and water flows from the valve cartridge outlets through hose spray pipe 64, air will be drawn inwardly from the spout through passages 124 which will have the effect of applying additional force to the water discharge through the auxiliary device. There will be no flow or greatly reduced flow through the spout outlet. There is a venturi action because the passage 120 of venturi 118 is smaller than the cross-sectional area of hose spray pipe 64 with the result that air will be sucked in through the housing outlets and this air will supplement the pressure of the spray discharge. A diverter is not required, as is customary in most kitchen faucet applications in which there is a hose spray. When the hose spray is not operated, the normal path of water will be through the venturi member and then around its end and into chamber 122 and then outwardly through passages 124, into chamber or space 126 through port 128 into spout 70.

Valve cartridge 80 is held within housing 66 by means of a nut 140 which is threaded onto the exterior of housing 66 and in its fully assembled position rests upon a ledge 142 of the housing. The upper end of nut 140 has an inwardly directed flange 144 which extends over an outwardly directed flange 96 on sleeve 82.

The operating mechanism for the valve includes a cap 146 which extends over the assembly described and has a lower surface which terminates adjacent an upper surface of shell 68 with the combination of the cap and the shell forming the decorative outer cover for the housing. Adjacent the top of cap 146 there is a partition 148 which is attached by means of a screw 150 to the upper end of the valve cartridge stem.

A lever 156 has a hook 158 which extends inside of cap 146 through an opening in the cap indicated at 160. A similar lever is shown in U.S. Pat. No. 3,726,316. The hook extends partially, but not completely, about sleeve 82 and is positioned within a groove 162 in the sleeve. Thus, lever 156 is attached to the sleeve and passes through an opening in the cap whereby up and down movement of the lever will cause in and out axial movement of the valve cartridge stem which is attached to cap 146. Similarly, rotary motion of handle 156 will cause rotary movement of the stem, thus providing the rotary and axial movements required to control the volume and temperature of water discharged through the valve cartridge.

There is an exterior projection 164 on the sleeve which functions as a stop limiting rotary movement of the cap and lever. Cap 146 has an interior annular wall 155 which defines a chamber 157. End surfaces 161 and 163 with projection 164 define the limits of cap movement. Thus, as is conventional in single lever mixing faucets, the lever and cap are rotated between stops, one limiting movement in the cold water direction, and the other limiting movement in the hot water direction.

In order that the cap be properly positioned relative to the valve cartridge so that the stops are in the proper location for limiting handle rotation, there is a lever installation key 166 which is positioned within cap 146 in a space 168. Key 166 has an elongated portion 170 which extends within a groove or recess 172 in that portion of the hook 158 of handle 156 which is directly opposite the handle. Groove 172 is in alignment with space 168 as shown in FIGS. 3 and 4. Thus, key 166 locks cap 146 to the lever and also insures that the positioning of the cap and lever are correct relative to the valve cartridge so that the user knows from the position of the handle on the sink whether it is in a hot water position, a cold water position or a mixed water position. Key 166 couples the lever to the cap and provides a means to transfer rotational force from the lever to the cap. Installation key 166 has an upper shoulder 174 which provides a means for quickly removing the key from its position within the cap once exterior bezel 176 has been removed from the end of the cap.

When the handle and cap are installed on the housing and valve cartridge, the handle fits through opening 160 in the cap and the handle and cap as a unit slide over the end of the stem with the hook portion being positioned within groove 162 on the valve cartridge sleeve. Once the elements are so positioned, installation key 166 passes through the aligned openings in the cap and handle, locking these elements to the sleeve and insuring that they are properly positioned relative to each other. Bezel 176 may then be inserted to complete installation. In some applications, the cartridge will be used in a faucet without a lever, only a handle, and pivot groove 162 will not be used.

As described earlier, valve cartridges of the present type have all of the operating parts of the valve therein and thus replacement of the cartridge effectively renews the faucet. However, after such a cartridge has been installed and used in a faucet for a number of years, the cartridge may be difficult to remove. The present invention provides not only a means for assisting removal of the cartridge, but also a means to insure that the cartridge is properly positioned within the valve housing. On the exterior of sleeve 82, integral with flange 96, are a pair of diametrically opposed trapezoidal projections 178. These projections will mate with a corresponding trapezoidal-shaped recess 180 at the top of housing section 92 when the valve cartridge is properly positioned within the housing. The trapezoidal shape of projections 178 provides a pair of cam surfaces 182 on opposite sides thereof. When the cartridge is to be removed, and after the cap, lever and nut have been taken off, the first step is to rotate the entire cartridge. Such rotation, by the interaction of the cam surfaces 182 on trapezoidal projections 178 with the mating cam surfaces on recess 180 has the effect of forcing the cartridge to move outwardly from the housing. Any corrosion or other bond which holds the cartridge within the housing is broken by the rotary motion of the sleeve and the consequent axial movement of the sleeve caused by the mating and cooperating cam surfaces described.

FIGS. 7, 8 and 9 disclose a further embodiment of the present invention which is substantially similar to the structure of FIG. 1, but with certain important modifications. The sleeve and sleeve seals are given the same numbers as in the FIG. 1 embodiment. The stem includes a thin rod 200 attached at one end to a stem driver 202 and at the opposite end to a piston 204. The piston 204 is similar to piston 24 in the FIG. 1 embodiment except that the discharge end of the piston is open, as at 206, and the opposite end of the piston, indicated at 208, is closed, except for a plurality of vent passages 210.

Positioned within the valve sleeve is a stem control cage 212 which is shown in detail in FIGS. 8 and 9. The cage is attached to the sleeve through outwardly-extending hooks 214 which are received within a groove or recess 216 at the outer end of the sleeve. Cage 212, which may conveniently be formed in two identical halves for ease of construction and installation, has a hollow interior 218 within which the stem driver 202 moves. There is a passage 220 which accomodates thin rod 200. The stem control cage has a pair of inwardly facing flatted surfaces 222, shown particularly in FIGS. 8 and 9, which cooperate with mating surfaces 224 on the stem driver to provide a friction brake in the manner described above. The flatted surfaces on the stem control cage are formed as a part of inwardly-directed portions 226 of the stem control cage, which inwardly-directed portions ride within recesses 228 in the stem driver, which recesses form the friction surfaces 224.

In the event that the friction developed between surfaces 222 and 224 is inadequate for proper control of stem movement, in some applications of the valve the relative sizes of passage 220 and thin rod 200 may be controlled to the point where there is a degree of friction therebetween which may either be used in place of or auxiliary to the described brake frictional surfaces 222 and 224.

The non-movable seal member 40 of the FIG. 1 embodiment has been replaced by a seal member 230 which has an outwardly-directed, somewhat rounded annular projection 232 bearing against the inside of the sleeve to anchor the seal to the sleeve. Seal 230 also has inwardly-directed hook members 234 which may be continuously annular or in sections and which extend into mating grooves 236 in the stem control cage. Thus, seal 230 not only performs the normal sealing functions described in connection with the FIG. 1 embodiment, but it is also effective to hold the two halves of the stem control cage into a unitary structure. If it is desired to have friction between thin rod 200 and passage 220 as described above, the rubber or elastomeric material of seal 230 may be effective to assist in providing such friction by the degree to which it holds the two sections of the stem control cage together.

Seal 230 has axially extending projections 238 and 240, each of which is annular, with one being an interior projection and the other being along the outside of the seal and generally adjacent the inside of the sleeve.

The stops limiting movement of the stem and thus protecting the integrity of the thin rod as described above, are formed by cooperating areas on the stem driver 202 and stem control cage 212. Inward movement of the stem driver is limited by contact between surface 241 of the stem driver and opposing surface 242 of the stem control cage. Outward movement is limited by contact between flange 244 of the stem driver and opposing surface 246 on inwardly-extending portions 226 of the stem control cage. Thus, cooperation between the stem driver and the stem control cage provides the stops which are necessary to prevent undue stress being applied to thin rod 200.

The FIG. 10 embodiment again is similar to the FIG. 1 embodiment and the embodiment in FIGS. 7, 8 and 9. In this case piston 250 is the same as piston 24 in the FIG. 1 embodiment. Seal 252 is not anchored to the inside of the sleeve, but is positioned by the stem control cage 254. Seal 252 has a bumper 256 to protect the seal from contact with the piston.

The stem control cage 254 is similar to the FIGS. 7-9 embodiment and again there may be cooperating braking surfaces on the stem control cage and the stem driver. In the alternative, there may be a separate braking element 258 which is keyed, as at 259, to the stem driver for movement therewith by flanges 260 and 262. As the stem driver moves, brake 258 will move with it and there will be frictional contact between the exterior of the brake and an interior surface 264 on stem control cage 254.

Stops limiting movement between the stem driver and the stem control cage are the same as indicated in the FIGS. 7-9 embodiment.

Whereas the preferred form of the invention has been shown and described herein, it should be realized that there may be many modifications, substitutions and alterations thereto.

The embodiments of the invention in which an exclusive property or privilege is claimed are defined as follows:

1. A hot and cold water mixing valve including a sleeve means formed and adapted to fit within a valve fixture such as a kitchen faucet, lavatory faucet or shower/tub control, said valve including a pressure unbalanced stem rotatable and reciprocal within the sleeve means, said sleeve means having hot and cold water inlet ports and an outlet, said stem including a piston having flow control means controlling flow between said sleeve means inlet ports and sleeve means outlet, said stem including a stem driver formed and adapted to have an operating handle mounted thereon with said stem driver being connected to said piston by a solid thin rod whose diameter is substantially less than the piston outer diameter, the pressure unbalance of the stem being determined by the cross section area of said thin rod, a non-movable seal member within said sleeve means, and in sealing engagement with an interior surface of said sleeve means and the outer periphery of said thin rod, said stem driver being attached to said thin rod on one side of said seal member and said piston being attached to said thin rod on the opposite side of said seal member, friction means effective to provide frictional resistance to relative movement between said stem and sleeve means, seal members attached to the exterior of said sleeve means and providing a valve closing seal when said piston is in a closed position.

2. The mixing valve of claim 1 further characterized in that said piston is a thin, hollow shell having an inlet port registrable with said sleeve means inlet ports and an interior chamber communicating with said sleeve means outlet.

3. The mixing valve of claim 1 further characterized in that said piston includes an element having a water directing surface communicating with said sleeve inlet ports and sleeve outlet.

4. The mixing valve of claim 1 further characterized by and including stop means on the interior of said sleeve means cooperating with said frictional resistance means to prevent outward movement contact of said piston and seal member.

5. The mixing valve of claim 4 further characterized by and including a partition within said sleeve, means with said seal member being positioned on one side of said partition and said stem driver being positioned on the opposite side of said partition, said partition limiting inward movement of said stem driver and piston.

6. The mixing valve of claim 1 further characterized by and including a stem control cage positioned within said sleeve means, said stem driver being movable within said stem control cage.

7. The mixing valve of claim 6 further characterized in that said friction means includes a brake effective between said stem driver and stem control cage.

8. The mixing valve of claim 7 further characterized in that said stem driver and stem control cage have cooperating contacting friction brake surfaces.

9. The mixing valve of claim 7 further characterized in that said brake includes a braking member carried by said stem driver and in frictional contact with said stem control cage.

10. The mixing valve of claim 6 further characterized in that said friction means includes cooperating braking surfaces on opposed portions of said stem control cage and thin rod.

11. The mixing valve of claim 6 further characterized by and including stop means on said stem control cage limiting movement of said piston.

12. The mixing valve of claim 6 further characterized in that said non-movable seal is in interfitting engagement with said stem control cage.

13. The mixing valve of claim 1 further characterized in that said non-movable seal has bumper portions thereof extending toward said piston.

14. The mixing valve of claim 1 further characterized by and including an outwardly extending projection on the exterior of said sleeve means adjacent one end thereof, which projection is formed and adapted to cooperate with an operating handle mounted on said stem driver to limit rotary movement of said stem.

15. The mixing valve of claim 1 further characterized by and including locating means formed on the exterior of said sleeve means and formed and adapted to cooperate with the valve fixture for positioning the mixing valve within the valve fixture.

16. The mixing valve of claim 15 further characterized in that said locating means includes at least one cam surface which cooperates with the interior of the valve fixture whereby, upon rotation of the sleeve means fully inserted within the valve fixture, the sleeve means cam surface causes the sleeve means to be moved outwardly from the valve fixture.

17. The mixing valve of claim 16 further characterized in that said locating means is trapezoidal in configuration, with the sides thereof each forming a cam surface.

18. The mixing valve of claim 1 further characterized in that said sleeve means and piston have open bottoms which form communicating piston and sleeve means outlets for said valve.

19. The mixing valve of claim 18 further characterized by and including a fixture for holding said mixing valve, said fixture including outlet means adjacent the open bottoms of said sleeve means and piston and extending generally transverse thereto, an auxiliary discharge generally in axial alignment with said piston and sleeve means open bottoms, and a venturi member positioned within said fixture in alignment with said auxiliary discharge and masking and being spaced from said fixture outlet means, said venturi member having a passage smaller than the auxiliary discharge, whereby use of said auxiliary discharge draws air inward from said fixture outlet means, water flowing around the open end of said venturi member and to said fixture outlet means when said auxiliary discharge is closed.

20. The mixing valve of claim 19 further characterized in that the fixture outlet means includes a plurality of passages extending transversely to the open bottom outlets of said piston and sleeve means.

21. The mixing valve of claim 20 further characterized in that said venturi member includes an outwardly-directed flange supported on the fixture and a central tube which masks the fixture outlet passages.

22. A hot and cold water mixing valve including
a valve fixture such as a kitchen faucet, lavatory faucet or shower/tube control, a sleeve means formed and adapted to fit within the valve fixture and a rotatable and reciprocal step positioned within the sleeve means, said sleeve means having hot and cold water inlet ports and an outlet, said stem having an inlet and an outlet, with the stem inlet being movable into register with the sleeve means inlet ports and with the stem outlet being registrable with the sleeve means outlet,
locating means formed on the exterior of said sleeve means and cooperating with locating means on the interior of the valve fixture for positioning the sleeve means and stem within the valve fixture,
said locating means including at least one cam surface on the exterior of said sleeve means which cooperates with a cam surface on the interior of the valve fixture whereby, upon rotation of a fully inserted sleeve means within a valve fixture, the cam surfaces cause the sleeve means to be moved outwardly from the valve fixture.

23. The mixing valve of claim 22 further characterized in that said sleeve means locating means is trapezoidal in configuration, with the sides thereof each forming a cam surface.

24. A hot and cold water mixing valve including a valve fixture such as a kitchen faucet, lavatory faucet or shower/tube control, a sleeve means formed and adapted to fit within the valve fixture and a rotatable and reciprocal stem positioned within the sleeve means, said sleeve means having hot and cold water inlet ports and a bottom outlet, said stem having an inlet movable into register with said sleeve means inlet ports and a bottom outlet in alignment with said sleeve means outlet,
said valve fixture including output means adjacent the sleeve means and stem outlets and extending generally transverse thereto, an auxiliary discharge generally in coaxial alignment with said stem and sleeve means outlets, and a venturi member positioned within said fixture in coaxial alignment with said auxiliary discharge and stem and sleeve means outlets and masking and being spaced from said fixture outlet means, said venturi member having a passage smaller than the auxiliary discharge, whereby use of said auxiliary discharge draws air inward from said fixture outlet means, wter flowing around the open end of said venturi member and to said fixture outlet means when said auxiliary discharge is closed.

* * * * *